(12) United States Patent
Varner et al.

(10) Patent No.: US 7,130,515 B2
(45) Date of Patent: Oct. 31, 2006

(54) TRIPLE-BAND BEND TOLERANT OPTICAL WAVEGUIDE

(75) Inventors: Wayne F. Varner, Woodbury, MN (US); Craig R. Sykora, New Richmond, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 141 days.

(21) Appl. No.: 10/930,575

(22) Filed: Aug. 31, 2004

(65) Prior Publication Data

US 2006/0045449 A1 Mar. 2, 2006

(51) Int. Cl.
*G02B 6/02* (2006.01)

(52) U.S. Cl. .................. 385/128; 385/127; 385/123

(58) Field of Classification Search ......... 385/123–128
See application file for complete search history.

(56) References Cited

U.S. PATENT DOCUMENTS

| | | | |
|---|---|---|---|
| 4,715,679 A | 12/1987 | Bhagavatula | |
| 4,836,640 A | 6/1989 | Gartside, III et al. | |
| 4,838,643 A | 6/1989 | Hodges et al. | |
| 4,852,068 A | 7/1989 | Track | |
| 5,032,001 A | 7/1991 | Shang | |
| 5,278,931 A | 1/1994 | Antos et al. | |
| 5,555,340 A | 9/1996 | Onishi et al. | |
| 5,608,832 A | 3/1997 | Pfandl et al. | |
| 5,644,670 A * | 7/1997 | Fukuda et al. | 385/124 |
| 5,757,997 A | 5/1998 | Birrell et al. | |
| 5,852,690 A | 12/1998 | Haggans et al. | |
| RE36,146 E | 3/1999 | Novack et al. | |
| 5,902,435 A | 5/1999 | Meis et al. | |
| 6,005,999 A | 12/1999 | Singh et al. | |
| 6,269,210 B1 | 7/2001 | Yagi et al. | |
| 6,390,690 B1 | 5/2002 | Meis et al. | |
| RE38,086 E | 4/2003 | Onishi et al. | |
| 6,577,800 B1 | 6/2003 | Sarchi et al. | |
| 6,587,628 B1 | 7/2003 | Walker | |
| 6,711,330 B1 | 3/2004 | Donlagic | |
| 6,731,847 B1 | 5/2004 | Kato et al. | |
| 2003/0026566 A1 | 2/2003 | Diep et al. | |
| 2003/0099451 A1 | 5/2003 | Walker, Jr. et al. | |
| 2003/0231847 A1 | 12/2003 | Varner | |

FOREIGN PATENT DOCUMENTS

| | | |
|---|---|---|
| EP | 0 447 075 A2 | 9/1991 |
| EP | 0 554 714 A1 | 8/1993 |
| EP | 1 094 346 A1 | 4/2001 |

(Continued)

OTHER PUBLICATIONS

Lazay, P.D., et al; "Developments in Single-Mode Fiber Design, Materials, and Performance at Bell Laboratories", *IEEE Journal of Quantum Electronics* (Apr. 1982); vol. QE-18, No. 4; pp. 504-510.

(Continued)

*Primary Examiner*—Kevin S. Wood
(74) *Attorney, Agent, or Firm*—Gregg H. Rosenblatt (57) ABSTRACT

An optical waveguide comprises a core, an inner cladding laterally surrounding the core, and an outer cladding laterally surrounding the inner cladding, wherein the core, inner cladding, and outer cladding have a depressed well configuration. The waveguide operates in three or more wavelength bands, wherein a first wavelength band is centered at about 1300 nm, and wherein a second wavelength band is centered at about 1625 nm. The waveguide has bend losses that are less than or equal to 0.7 dB/turn when measured on a 10 mm radius bend at 1625 nm.

13 Claims, 3 Drawing Sheets

FOREIGN PATENT DOCUMENTS

| | | | |
|---|---|---|---|
| EP | 0 689 068 B1 | | 5/2002 |
| EP | 1 441 245 A2 | * | 7/2004 |

OTHER PUBLICATIONS

Ainslie, B.J., et al; "Low Loss Dual Window Single Mode Fibres with Very Low Bending Sensitivity", *IOOC-ECOC '85* (Oct. 1-4, 1985); 11th European Conference on Optical Communication, Venice, Italy; pp. 317-320.

Hagemann, H.-J., et al; "The Performance of Depressed-Cladding Single-Mode Fibers with Different b/a Ratios", *Journal of Lightwave Technology* (Jun. 1991); vol. 9, No. 6; pp. 689-694.

Allard, P.G., et al; "Bending-Loss Studies of a Single-Mode Triangular-Index Fiber with a Depressed Cladding Ring with a Vector-Mode Method", *Applied Optics* (Nov. 20, 1994); vol. 33, No. 33; pp. 7725-7732.

Dong, L., et al; "Optical Fibers with Depressed Claddings for Suppression of Coupling into Cladding Modes in Fiber Bragg Gratings", *IEEE Photonics Technology Letters* (Jan. 1997); vol. 9, No. 1; pp. 64-66.

Agrawal, G.P., *Fiber-Optic Communication Systems*, 2nd Ed. (1997); pp. 438-445.

Ennser, K., et al; "Influence of Nonideal Chirped Fiber Grating Characteristics on Dispersion Cancellation", *IEEE Photonics Technology Letters* (Oct. 1998); vol. 10, No. 10; pp. 1476-1478.

Scheerer, C., et al; "Influence of Filter Group Delay Ripples on System Performance", *ECOC '99* (Sep. 26-30, 1999); Nice, France; pp. I-410-I-411.

Scheerer, C.; "Phase Distortions in Optical Transmission Systems", *Frequenz* (2000); vol. 54, No. 1-2; pp. 42-46.

Product Brochure, "Single-Mode Optical Fiber—SMF-28™ Fiber"; Corning, Inc., Corning, NY (2001).

* cited by examiner

TRIPLE-BAND BEND TOLERANT OPTICAL WAVEGUIDE

FIELD OF THE INVENTION

The present invention relates to an optical waveguide operating in the 1300–1650 nm window. In particular, the present invention relates to a depressed well optical fiber having a triple wavelength band design that is able to operate in tight bend environments with minimal bend induced losses. Further, the optical fiber can have a mode field diameter (MFD) that closely matches large mode-field diameter fibers such as common long haul telecommunications fibers.

BACKGROUND OF THE INVENTION

Optical fibers form some of the main lines through which telecommunications data is connected all over the world. An optical fiber typically includes a core region surrounded concentrically by a cladding. Some fiber designs, known as "double cladding" designs, surround the core region with an inner cladding, which is in turn surrounded by an outer cladding. The outer cladding likewise is surrounded by an external medium.

The parameters in such double cladding waveguide designs usually are:

Dependent Parameters
  MFD operational mode field diameter
  $\lambda$ operational wavelength
  $\lambda_c$ second mode cutoff wavelength Independent Parameters
  $r_{co}$ core radius generated from a single effective (refractive index) step approximation of the core region
  $r_{ic}$ inner cladding radius
  W inner cladding width ($r_{ic}-r_{co}$) generated from a single effective step approximation of the inner cladding region
  $r_{oc}$ outer cladding radius
  $n_{co}$ core refractive index generated from a single effective step approximation of the core region
  $n_{ic}$ inner cladding refractive index generated from a single step approximation of the inner cladding region
  $n_{oc}$ outer cladding refractive index
  $n_{ext}$ external medium refractive index $+\Delta = (n_{co}-n_{oc})/n_{oc}$ $-\Delta = (n_{ic}-n_{oc})/n_{oc}$ $\Delta_{Tot} = |(+\Delta)|+|(-\Delta)|$ Early large-scale commercial systems were designed to operate at an operational wavelength $\lambda$ of about 1300 nm, a region of relatively low optical absorption loss and very low chromatic dispersion for silica fibers. In addition, intrinsic optical absorption losses in silica fibers were known to be even lower at 1550 nm.

Fiber suppliers began making telecommunications optical fibers that could operate at either 1300 nm or 1550 nm, such as Corning SMF-28™ single mode fiber. This fiber has a typical core diameter of 8.2 micrometers and a MFD of about 9–10 microns in the window from 1300 nm to 1550 nm. This fiber is known as a "matched clad" design with an effective step index core having a (normalized or relative) core refractive index above the outer cladding ($+\Delta = (n_{co}-n_{oc})/n_{oc}$) of about 0.0035.

Early fiber optic telecommunication systems involved "long haul" applications from one telephone company central office to another. Long haul telecommunications fibers are typically kept relatively straight in large multi-fiber cables, and are thus protected from bending losses of light due to exceeding the critical bend radius of the fiber design (typically in the range of 25 mm to 12.5 mm).

A recent trend had been to extend fiber optics outward from the central offices, providing "fiber to the campus" and "fiber to the desktop" in commercial buildings, and "fiber to the neighborhood" and eventually "fiber to the home" in residential areas, sometimes referred to as "Fiber-To-The-X," or "FTTX." One conventional example for premises applications is the Volition™ VF-45 fiber optic connector and premise "wiring" system, manufactured by 3M Company, of St. Paul, Minn., as shown in several patents, including U.S. Pat. No. 5,757,997.

To minimize optical losses in connectors such as these, the optical fibers are designed to operate at the same wavelength and have approximately the same mode field diameter (MFD) at that wavelength. For such connectors, it is not practical to adjust the MFD of the two fiber ends (for duplex applications) by high temperature diffusion of core dopants, as can be done when fusion splicing two optical fibers for long haul cables (see, e.g., EP 1094346 A1).

As a light signal travels in an optical fiber the signal is attenuated, due to both material effects and waveguide effects. Waveguide effects include two categories of optical bending loss, microbending and macrobending losses. Macrobending loss occurs when a length of fiber is bent into a curve such that some light is radiated out of the core into the cladding of the fiber and lost. Microbending losses result from concentrated pressure or stresses exerted on the surface of the fiber. Microbending loss occurs when the fiber is exposed to localized pressures and stress points as, for example, if the fiber is pressed against a rough textured surface (such as sandpaper). When the outer surface of the fiber is pressed against the raised points, a coating that is too hard may transfer these stresses to the core, causing scattering losses. Microbend losses are usually negligible for short lengths of fiber.

Such stresses may be reduced by providing a relatively soft, low-modulus inner coating on the surface of the glass fiber. However, usually such coatings are removed from the fiber end in order to accurately align a single mode fiber with another fiber in a connector. The stripped fiber ends are then susceptible to breakage from abrasion and moisture.

A solution to this problem is a fiber having a glass core, glass cladding, polymer cladding construction (referred to herein as a "GGP" fiber), as described in U.S. Pat. No. RE 36,146, which is hereby incorporated by reference. The RE 36,146 patent describes several polymer coatings and other coating materials that can be used in manufacturing GGP fibers. Other polymer coatings and/or coating materials are described in U.S. patent Publication No. 2003-0099451 A1, now allowed; U.S. Pat. No. 6,587,628, U.S. Pat. No. 5,644,670; and U.S. Pat. No. 6,269,210 (all of which are hereby incorporated by reference).

These polymer coatings typically have a Shore D hardness of about 55 or more, or a Young's Modulus of from 50 kg/mm² to 250 kg/mm² at room temperature, and these coatings can adhere tightly to the outermost glass surface of the optical fiber. They are exemplarily applied to an optical fiber such that their outer surface is sufficiently concentric with the core of the optical fiber that when a GGP fiber is placed in a typical fiber optic mechanical connector and optically connected to a second fiber, the optical loss is not significantly greater than for a similar connection using an uncoated fiber having the same outer diameter as the GGP optical fiber.

In addition, the glass portion of the GGP fiber can be smaller than the standard 125 micrometer outside diameter, and an adherent, very concentric, and relatively hard polymer layer (coating) is added to bring the fiber diameter up to the standard 125 micrometer diameter while maintaining concentricity for connectorization. The construction is cabled within a low-modulus coating to minimize microbending losses, but when the low modulus coating is stripped off for connectorization the outer glass surface of the fiber is not exposed or damaged.

Among the optical fiber applications with the most severe bending loss requirements have been the fiber optic guided missile (FOG-M) and tethered weapons applications for the military. Designs for fibers used in tethered weapon applications have concentrated on keeping the light signals very tightly confined in the fiber core, by designing fibers with small MFD (~4–7 micrometers at 1550 nm). Some designs include a depressed refractive index well around the core (so called "W" fibers) that provide for a broader range of operating wavelengths. The high matched clad index design may also provide reasonable bend tolerance if designed to operate at a single wavelength. Examples of depressed well, small MFD fibers are described in U.S. Pat. Nos. 4,838,643, and 5,032,001.

Although these fibers provide low bend loss, their small MFDs make them unsuitable for connectorization to the low cost, large (>8.0 microns) MFD telecom fibers. Multi-wavelength versions of these fibers have the smallest MFDs and therefore the largest MFD mismatches and associated connector losses making them impractical for premise applications. These fibers can only be fusion spliced or thermally treated to eliminate the MFD mismatch, which are not practical procedures for the multiple plug-in/disconnect applications.

In general, fiber designs with smaller MFDs have a higher numerical aperture (NA) at a given wavelength, since both parameters indicate a more tightly confined optical mode, which will be less affected by macrobending or other external influences. The relationship between MFD, macrobending loss, and second mode cutoff wavelength is discussed in U.S. Pat. Nos. 5,608,832 and 5,278,931, and references therein. Further discussion of the relationship between MFD, macrobending loss, and second mode cutoff wavelength is discussed in the commonly owned, co-pending U.S. patent Publication No. 2003-0099451 A1 (incorporated by reference herein in its entirety).

SUMMARY

According to one aspect of the present invention, an optical fiber comprises a core, an inner cladding laterally surrounding the core, and an outer cladding laterally surrounding the inner cladding, wherein the core, inner cladding, and outer cladding have a depressed well configuration. The fiber operates in three or more wavelength bands, wherein a first wavelength band is centered at about 1300 nm and a second wavelength band is centered at about 1625 nm. In addition, the fiber has bend losses that are less than or equal to 0.7 dB/turn when measured on a 10 mm radius bend at 1625 nm. A third operating wavelength band for the fiber can be centered at about 1550 nm.

According to another aspect of the present invention, an optical waveguide includes a core having a refractive index $n_{co}$ and a radius $r_{co}$, an inner cladding laterally surrounding the core, the inner cladding having a refractive index $n_{ic}$ and an outer radius of $r_{ic}$, and an outer cladding laterally surrounding the inner cladding, the outer cladding having a refractive index $n_{oc}$. The core, inner cladding, and outer cladding have a narrow depressed well configuration, wherein $n_{co}>n_{oc}>n_{ic}$. The range of the ratio of the inner, depressed-well clad radius, $r_{ic}$, to core radius, $r_{co}$, varies from about 3.0 to 5.0. The waveguide has a $+\Delta$ of about 0.0020 to 0.0035, a $-\Delta$ of about $-0.001$ to $-0.0015$, and a $\Delta_{Tot}$ of about 0.0030 to 0.0045.

In one exemplary embodiment, the optical waveguide has a depressed-well clad to core radius ratio of about 3.9, a $+\Delta$ of about 0.0021, a $-\Delta$ of about $-0.0012$, and a $\Delta_{Tot}$ of about 0.0033. An exemplary core diameter for a waveguide in accordance with the present invention is about 10–12 micrometers. An exemplary operating wavelength range is between about 1300 to 1650 nm and a second mode cabled cutoff wavelength of less than 1260 nm. An exemplary MFD is between about 7.8 to 9.0 microns when measured at 1300 nm, and/or between about 8.6 to 10.2 microns when measured at 1550 nm.

Values for bend losses for an exemplary fiber according to the present invention are less than or equal to 0.15 dB/turn when measured on a 10 mm radius bend at 1550 nm and bend losses less than or equal to 0.7 dB/turn when measured on a 10 mm radius bend at 1625 nm. Another exemplary embodiment exhibits bend losses less than or equal to 0.02 dB/turn when measured on a 10 mm radius bend at 1550 nm. Yet another exemplary embodiment has bend losses less than or equal to 0.01 dB/turn when measured on a 10 mm radius bend at 1625 nm.

In particular exemplary embodiments, the optical waveguide has a glass core and claddings, and further includes a polymer coating, such as a hard polymer coating, permanently bonded or adhered to the outside surface of the glass waveguide. The waveguide may further include a soft polymer material coating the hard polymer, wherein the soft polymer materials may comprises coatings selected from the group of Desolite 3471-3-14, Desolite 3471-1-152A, and Shin-Etsu OF-206.

The inner cladding of exemplary embodiments may include fluorosilicate, borosilicate, phosphorus fluorosilicate, phosphorus borosilicate, germanium fluorosilicate or germanium borosilicate compositions.

The optical waveguide may be an optical fiber, such as a single-mode, triple-band optical fiber. Optical devices including waveguides in accordance with the present invention are also contemplated.

Fibers in accordance with embodiments of the present invention provide tight bend tolerance in high MFD (>9 micrometers at 1550 nm) designs, which allows them to be either fusion spliced or mechanically connected to other high MFD fibers with minimal splice losses.

Thus, waveguides of the present invention can be utilized for premise wiring and patch cables used for connecting equipment to the premise wiring that can operate at wavelengths in the 1300 nm and/or 1550 nm bands, and may further include system monitoring signals out to 1650 nm. The waveguides can have mode field diameters approximately matching that of telecommunications fibers such as Corning SMF-28™ single mode fiber, and can mechanically and optically tolerate prolonged bends with a bend radius less than half an inch (or 12 mm). Patch cord fiber implementations would preferably work from 1300 nm to 1650 nm, as 1380 nm range losses due to hydroxyl ion contamination would be negligible in the short lengths that patch cords comprise. The local communications systems to which they will be connected, particularly if these are based on fibers such as Corning SMF-28™ or similar span fibers utilized in communications systems, could be operating at any (or all) wavelengths. For such premise wiring and patch cables, which may include small single or duplex fiber optic cables, the fibers are designed to tolerate (both optically and mechanically) small radius bends, both for routing within walls and for jumper cables which may connect a fiber optic wall outlet to a computer or other piece of equipment.

DETAILED DESCRIPTION

As discussed above, the low attenuation design of some conventional fibers (e.g., SMF-28) result in high bend losses in tight bend applications. The present invention is directed to an optical waveguide, such as an optical fiber, that is closely mode matched to a conventional fiber (e.g., SMF-28) and has a satisfactory bend loss across the operating bands including 1300 nm to 1650 nm. According to the present description, three wavelength bands of particular interest include a first wavelength band centered at about 1300 nm (e.g., 1300 nm±20 nm), a second wavelength band centered at about 1550 nm (e.g., 1550 nm±50 nm), and a third wavelength band centered at about 1625 nm (e.g., 1625 nm±25 nm). The second wavelength band of interest centered at about 1550 nm can include the short, center, and long bands (i.e., S-, C-, and L-bands) of Erbium transmission.

Figure 1:
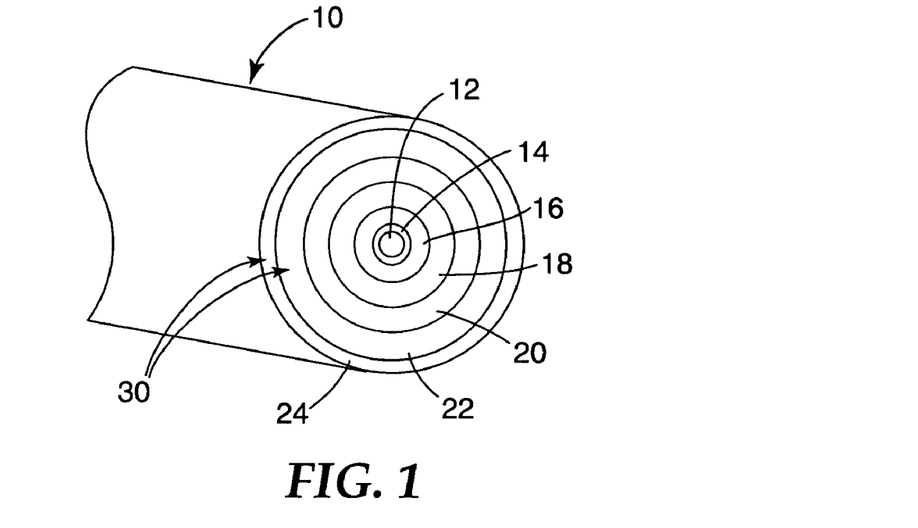
FIG. 1 is an isometric view of a cross-sectional cut of a waveguide in accordance with the present invention.

FIG. 1 shows an optical fiber 10 constructed in accordance with the present invention. Optical fiber 10 includes a protective coating 20 and a buffer 30. Optical fiber 10 further includes a core 12, inner cladding 14, and an outer cladding 16. The core 12, the inner cladding 14, and the outer cladding 16 are exemplarily constructed of glass, but may also be constructed of any suitable material. The claddings 14 and 16 also may be constructed from materials other than glass, such as fluoropolymers, fluoroelastomers, and silicones. One additional glass layer 18 concentrically surrounds the glass core and claddings. The layer 18 is the original support material collapsed from the initial preform tube, generally comprising silica glass.

Protective coating 20 is a coating described below and surrounds the layer 18. The protective coating can include the polymer-based coating formulations disclosed in commonly-owned U.S. Pat. No. 6,587,628. These materials are generally coatings for GGP fibers, which include UV-curable compositions cured with a photoinitiator such as an iodonium methide salt that does not hydrolyze to release HF or Fluoride ion, or an iodonium methide photoinitiator. These polymer-based protective coatings also provide protection for the glass surface from scratches and the moisture induced reduction in mechanical strength.

The buffer 30 longitudinally encloses optical fiber 10 includes in the particular embodiment illustrated an inner, resilient layer 22 and an outer, rigid layer 24. Inner, resilient layer 22 provides optical fiber 10 with protection against microbending losses while outer, rigid layer 24 protects the underlying layers from abrasion and mechanical damage.

Figure 2:
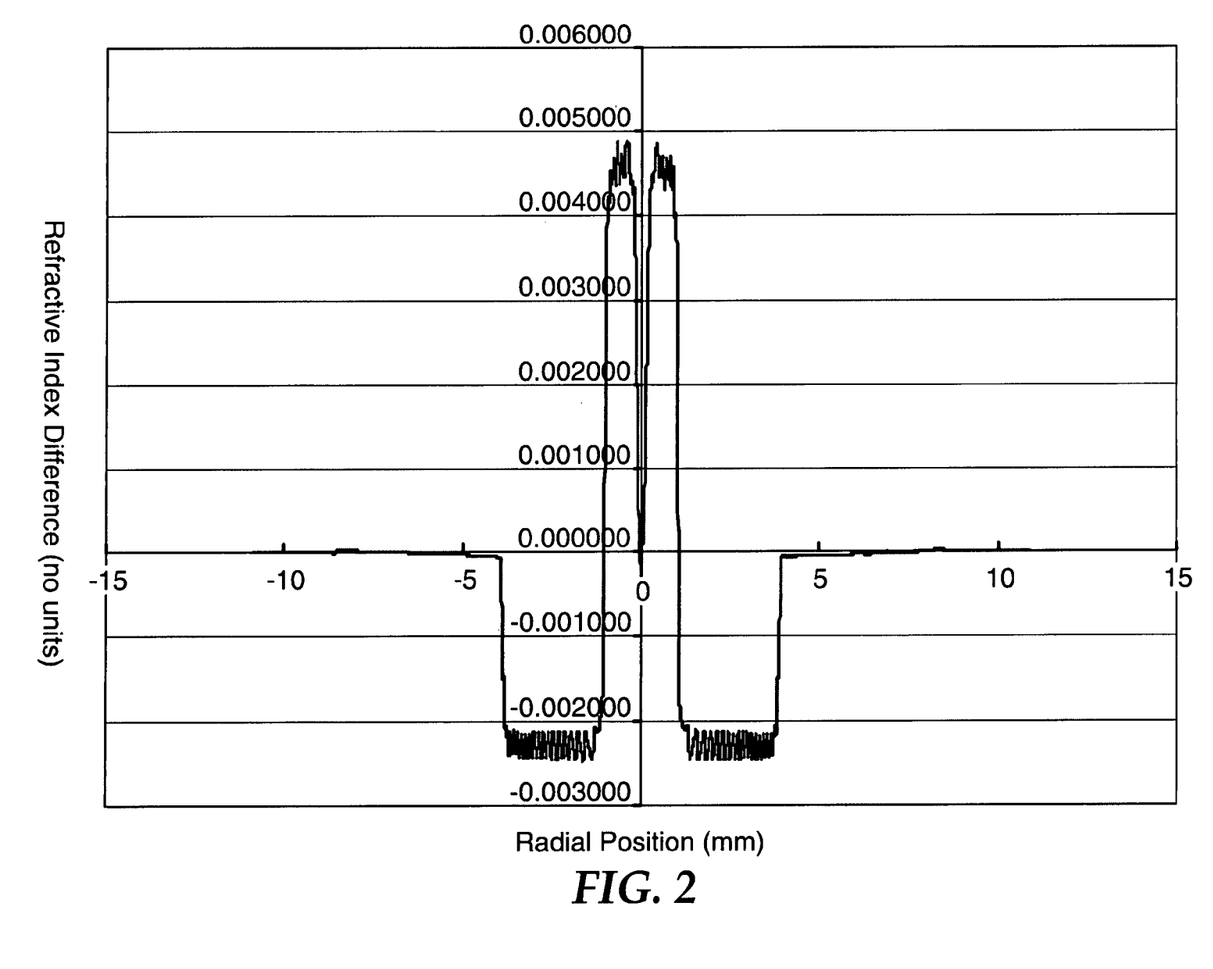
FIG. 2 is a graph depicting an actual refractive index profile along the diameter of an optical preform in accordance with an embodiment of the present invention.

FIG. 2 graphically illustrates the refractive index profile along the diameter of an embodiment of an optical fiber 10 in accordance with the present invention. Fiber 10, for this embodiment, was constructed as described below in Example 3.

Figure 3:
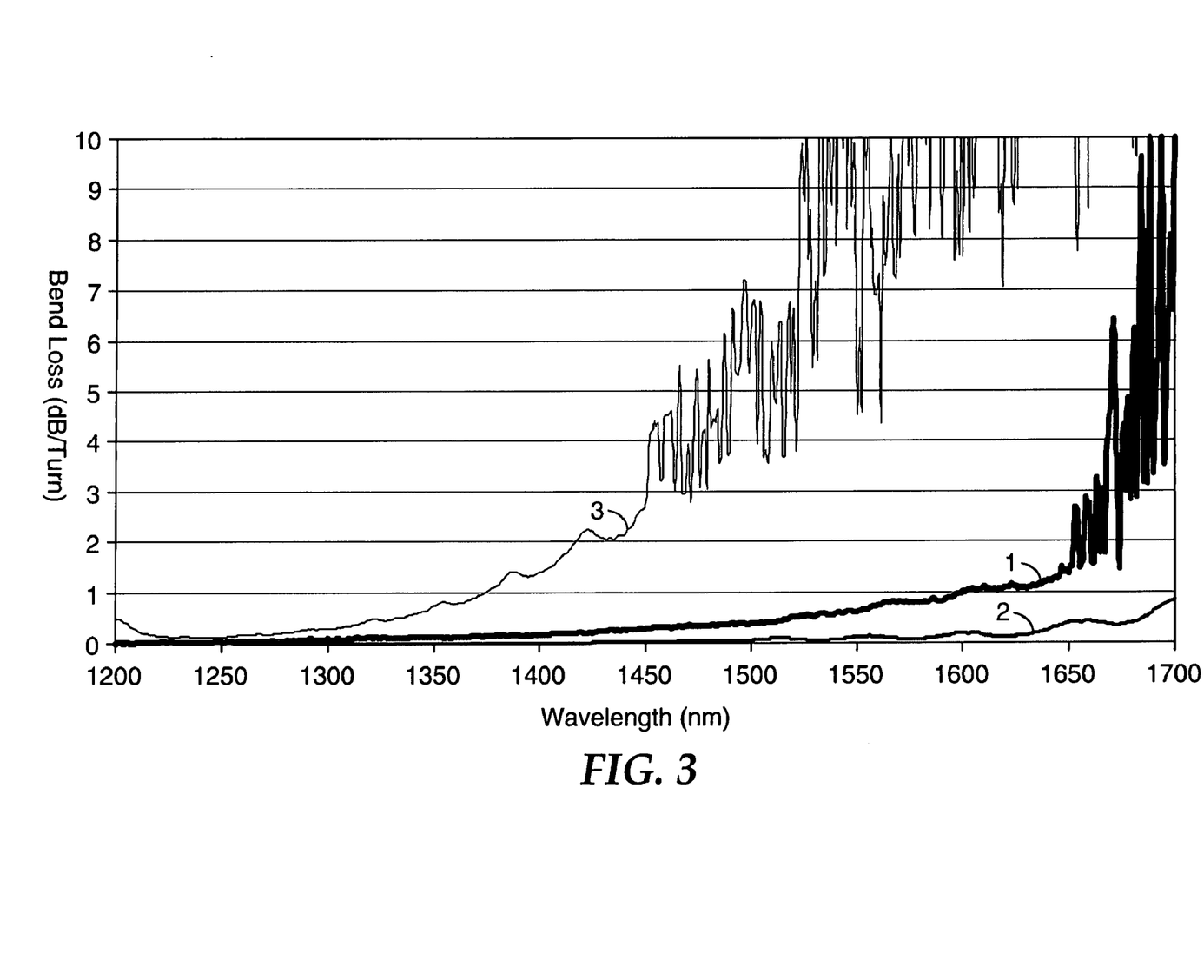
FIG. 3 is a comparison graph of attenuation vs. wavelength for a 10 mm bend radius comparing an embodiment of the present invention with a dual-wave fiber and a Corning SMF28 fiber.

FIG. 3 shows a comparison graph of attenuation vs. wavelength for a 10 mm bend radius comparing the same example tri-wave (TW) fiber with a dual-wave (DW) fiber, such as is described in commonly-owned, currently pending U.S. patent Publication No. 2003-0099451 A1 (incorporated by reference herein), and a conventional SMF28 fiber. It is noted that the example TW fiber provides an order of magnitude improvement in bend loss performance as compared to SMF28 for the 1550 nm and 1625 nm bands. Significant improvement in bend loss performance is also noted for the TW design as compared to a DW design for the 1550 nm and 1625 wavelength bands.

The optical fiber 10 can be a single-mode uncoated optical fiber having a circular cross-section. It is to be understood that other embodiments of the present invention may include multi-mode fibers, fibers with coatings, and fibers having different cross-sectional geometries known in the art.

The optical fiber 10 includes the core 12 having a first transverse dimension or diameter $2r_{co}$ and having a refractive index $n_{co}$. Laterally surrounding the core 12 is an inner cladding 14 having and a width W, $(r_{ic}-r_{co})$, an inner cladding or barrier radius $r_{ic}$ and a refractive index $n_{ic}$. The outer cladding 16, having a refractive index $n_{oc}$, laterally surrounds the inner cladding 14.

The refractive index of the air or other external medium or cladding surrounding the optical fiber is denoted as $n_{ext}$.

Unlike a typical matched cladding fiber, the optical fiber 10 has a depressed inner cladding configuration. As can be appreciated from FIG. 2, for fiber 10 the refractive index of the core $n_{co}$ has a greater absolute value than the refractive index of the outer cladding $n_{oc}$. In turn, the refractive index of the outer cladding has a greater absolute value than the refractive index of the inner cladding $n_{ic}$. Accordingly, $$n_{co} > n_{oc} > n_{ic}$$

The difference between $n_{co}$ and $n_{ic}$ and $n_{oc}$ and $n_{ic}$ creates a refractive index profile depressed well of width W and of depth $\Delta n-$, where $\Delta n-=n_{oc}-n_{ic}$. The difference between $n_{co}$ and $n_{oc}$ is defined as $\Delta n+$, where $\Delta n+=n_{co}-n_{oc}$. The total height of the core refractive index profile, $\Delta n$, equals $n_{co}-n_{ic}=\Delta n-+\Delta n+$. The equations for the normalized index delta are:

$$+\Delta = (n_{co}-n_{oc})/n_{oc};$$

$$-\Delta = (n_{ic}-n_{oc})/n_{oc}; \text{ and}$$

$$\Delta_{Tot} = |(+\Delta)| + |(-\Delta)|,$$

where $n_{co}$ is the effective step index of the core;
$n_{ic}$ is the refractive index of the inner cladding (the depressed well or moat); and
$n_{oc}$ is the refractive index of the outer cladding.

Figure 4:
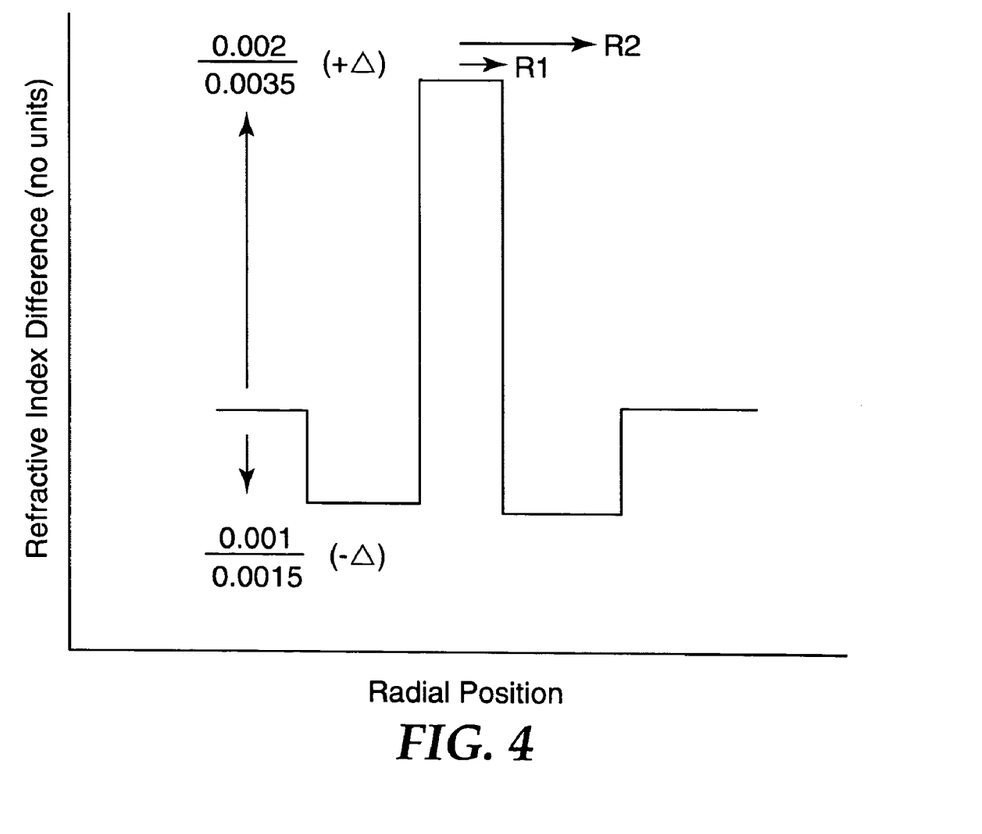
FIG. 4 is a schematic diagram of an exemplary index profile graph for an exemplary optical fiber in accordance with an embodiment of the present invention.

According to an exemplary embodiment, FIG. 4 shows an exemplary depressed-well index profile for a fiber having a triple-band wavelength of operation, with low attenuation losses in high bend radii environments (e.g, less than or equal to 0.7 db/turn when measured on a 10 mm radius bend at 1625 nm). For example, FIG. 4 shows a fiber structure having a core-clad radius of about 3.0 to about 5.0, a $+\Delta$ of about 0.0020 to 0.0035, a $-\Delta$ of about $-0.001$ to $-0.0015$, and a $\Delta_{Tot}$ of about 0.0030 to 0.0045.

Experimental Data

EXAMPLE 1

One exemplary embodiment of an optical fiber in accordance with the present invention has the following material composition:

A preform having the material composition described above was manufactured using the modified chemical deposition (MCVD) process using a 19×25 mm fused silica tube by first depositing 20 cladding layers with flows of 412, 40 and 19 standard cc/min of $SiCl_4$, $POCl_3$, and $SiF_4$, respectively. This was followed by 7 core layers consisting of 96 and 90 standard cc/min of $SiCl_4$ and $GeCl_4$, respectively, followed by two collapse passes and one seal pass resulting in a preform diameter of 17.8 mm. One or more overcollapses using 19×25 mm fused silica tubes may be required to obtain a final preform diameter of 23 mm. The refractive index profile of this preform prior to overcollapse is shown in FIG. 2. The preform was overcollapsed prior to drawing, and was drawn as an optical fiber.

In the present example, a hard, permanent polymer coating is placed on the outer surface of the glass portion to a diameter of 125.0 microns. A second, softer coating is applied over the UV curable primary coating to a diameter of approximately 180 microns. Typical materials used for this softer coating layer may include Desolite 3471-3-152A or Desolite 3471-3-14, available from DSM Desotech, Inc., 1122 St. Charles St., Elgin, Ill., 60120, or Shin-Etsu OF-206, available from Shin-Etsu Chemical Co., Ltd., 6-1, Otemachi 2-chome, Chiyoda-ku, Tokyo 100-0004, Japan. A third, harder coating is applied over the secondary coating to provide a durable outer coating. Typical materials for use as this harder coating may include Desolite 3471-2-136, Desolite 3471-3-14, also available from DSM Desotech, Inc. (Desolite 3471-3-14 is described as an intermediate hardness material which can be used for single-coat applications.) Commonly-assigned U.S. Pat. No. RE 36,146, U.S. Pat. No. 6,587,628, and U.S. patent Publication No. US 2003-0099451 A1, all of which are hereby incorporated by reference, discuss various possible coating compositions. The softer second coating helps reduce microbending losses by cushioning micro-stress points rather than transmitting micro-stresses to the light-carrying core.

The outer two coatings are easily stripped from the permanently bonded primary coating resulting in a protected fiber end having a coated diameter of 125.0 microns. This diameter is controlled in such a way that the stripped fiber end will fit in standard 125 micron connector ferrules.

The example fiber had the following characteristics:
 a.) clad/core radius ratio is 3.6
 b.) $+\Delta$ of 0.0032
 c.) $-\Delta$ of $-0.0011$
 d.) $\Delta_{Tot}$ of 0.0043

The procedure to measure bend loss followed the guidelines set forth in the EIA/TIA-455-62-A (FOTP 62) industry standard test method. Basically, the bend loss of the fiber was measured by wrapping the fiber around a mandrel having the specified radius, a predetermined number of turns and then measuring the difference in transmission between the same fiber in a straight configuration and the bent configuration.

This design resulted in example fiber with the following properties:
 Cutoff wavelength=1280 nm
 MFD @ 1300 nm=7.9 microns
 MFD @ 1550 nm=8.8 microns
 Bend loss (10 mm radius)<0.004 dB/turn @ 1550 nm
 Bend loss (10 mm radius)=0.01 dB/turn @ 1625 nm
 Bend loss (10 mm radius)=0.02 dB/turn @ 1650 nm.

EXAMPLE 2

A second sample of optical fiber having a similar design in accordance with the present invention was drawn and measured, with the following properties:
 a.) clad/core radius ratio is 3.9
 b.) $+\Delta$ of 0.0027
 c.) $-\Delta$ of $-0.0012$ d.)
 d.) $\Delta_{Tot}$ of 0.0039.

This design resulted in example fiber with the following properties:
 Cutoff wavelength=1310 nm
 MFD @ 1300 nm=8.1 microns
 MFD @ 1550 nm=9.2 microns
 Bend loss (10 mm radius)=0.02 dB/turn @ 1550 nm
 Bend loss (10 mm radius)=0.08 dB/turn @ 1625 nm
 Bend loss (10 mm radius)=0.12 dB/turn @ 1650 nm Index delta values were taken from measurements done on the fiber preforms before fiber drawing. The measurements were done with a He—Ne laser at 633 nm. The refractive index of the outer cladding in these fibers is essentially the same as pure silica, which for calculation purposes was taken to be 1.458 at 633 nm.

EXAMPLE 3

The bend performance of an optical fiber in accordance with another embodiment of the present invention (SMGGP-TW) was compared with commercially available SMF-28™ fiber from Corning, with commercially available Volition™ single wavelength band fiber (SMGGP-SW), and a dual wavelength band fiber (SMGGP-DW, as described in commonly-owned, currently pending U.S. Publication No. 03-0231847-A1) from 3M Company, St. Paul, Minn.

| | $+\Delta$ | $-\Delta$ | $\Delta_{Tot}$ | $R_{lc}/R_{co}$ | Cutoff Cable nm | MFD 1300 nm μm | MFD 1550 nm μm | Bend loss 1550 nm dB/turn | Bend loss 1625 nm dB/turn | Bend loss 1550 nm dB ¼ turn |
|---|---|---|---|---|---|---|---|---|---|---|
| Corning SMF28 ™ | 0.0035 | | 0.0035 | | <1260 | 9.2 | 10.4 | 0.38 | 0.6 | 2.4 |
| SMGGP-SW | 0.0024 | | 0.0024 | | <1160 | 9.2 | 10.4 | 1 | 1.6 | 3.3 |
| SMGGP-DW | 0.0020 | −0.0028 | 0.0048 | 2.6 | <1180 | 9.0 | 10.0 | 0.6 | 1.2 | 0.12 |
| SMGGP-TW | 0.0025 | −0.0016 | 0.0041 | 3.4 | <1260 | 8.6 | 9.4 | 0.1 | 0.3 | 0.05 |

In the above table, the bend loss measurements for columns 9 and 10 were measured using a 10 mm bend radius, and the bend loss measurements shown in column 11 (last column) were measured using a 6 mm bend radius (¼ turn). The table above shows that the SMGGP-TW fiber has much lower bend loss at 1625 nm wavelength compared to the SMGGP-SW and SMGGP-DW fiber designs. For example, bend losses on the SW design were about 1.6 dB/turn at a 10 mm radius and 1.2 dB/turn for the DW design while the triple wavelength (TW) design is about 0.3 dB. Although the mode field diameter (MFD) of the TW fiber is slightly smaller than the SW and DW designs, the added connectivity losses are less than 0.03 dB per connection at 1300 nm and 1550 nm. The TW fiber was designed to match the "cabled" cutoff characteristics of the Corning, SMF-28™, as measured per EIA/TIA-455-170 (FOTP 170) rather than a "fiber" cutoff resulting in a higher numerical aperture design which contributes to the better bend performance. The SW and DW fibers were designed to have fiber cutoffs of less than 1260 nm and 1280 nm, respectively, resulting in cabled cutoffs of less than about 1180 nm. The added mode spreading at the longer wavelengths due to the shorter cabled cutoff resulted in the fundamental mode bending out at a rapid rate on the DW design. The SW design was similarly penalized.

Those skilled in the art of optical waveguide manufacturing may readily ascertain a variety of chemical compositions that achieve the index profile disclosed in the present invention. Compositions used to fabricate modified chemical vapor deposition preforms in accordance with the present invention included a phosphorus fluorosilicate depressed-well inner cladding and a germanium silicate core. Other designs could include the use of phosphorus in the core to soften the glass for easier collapse.

In alternative embodiments, the core may include various index increasing dopant oxides such as phosphorus, germanium, aluminum, or lanthanum or combinations thereof. Similarly, the depressed cladding could be obtained by using fluorine and/or boron or combinations of these along with index enhancers such as the compositions used for the core. Such multi-component glasses may result in higher losses, but may be useful in obtaining other desirable fiber properties such as photosensitivity (for writing Bragg gratings) or a shifted dispersion characteristic.

An outer cladding that substantially matches the index of silica may be added with no change in overall performance. Other possibilities include a partially depressed outer cladding that could result in "softening" the fundamental cutoff versus wavelength characteristic.

An optical fiber in accordance with embodiments of the present invention has the ability to tolerate tight bends without resulting in undue mechanical stress, bend induced optical loss, or mechanical splice loss when connected to standard, high MFD fibers such as Corning's SMF-28. An exemplary design is capable of providing this performance at both of the common telecommunication operating wavelength windows of 1300 and 1550 nm as well as including the 1625 nm –1650 nm window that can be used for system monitoring. Special fiber constructions include smaller glass diameters that permit tighter bends without overstressing the fiber mechanically and can be combined with permanent coating technology (so-called "GGP" fiber) to build the glass diameter up from 80–100 microns to 125 microns. This permits the fibers to be connected using commonly available mechanical connectors designed for 125 micron glass diameter fibers.

The fiber design of embodiments of the present invention provides good modal confinement over a broad spectral range permitting one fiber to operate from 1300 to 1650 nm with minimal bend induced losses, while still being sufficiently mode matched to SMF-28 to provide low loss mechanical interconnection. The special depressed-well design is more bend tolerant than the matched clad design and offers an advancement in the state-of-the-art for mode matching to standard fibers, and would be useful for fiber-to-the-board applications. The term "fiber-on-the-board" refers to optical fibers routed on electronic circuit boards and backplanes, as disclosed in commonly-assigned U.S. Pat. Nos. 5,902,435 and 6,390,690.

Combining the triple wavelength window property of the glass design with the "permanent", precisely applied primary coating technology results in a fiber that can be used for both fiber-on-the-board and 1300–1650 nm applications (such as the VF-45™ patchcord connector where a 0.8" (2.03 cm) diameter bend is required). Another possible application for the present invention is FTTX, where the benefits of simplified mechanical splicing and interconnection would be valuable, e.g., for field termination and drop cable applications.

Those skilled in the art will appreciate that the present invention may be used in a variety of optical designs and that fibers in accordance with the present invention may be used in a variety of optical devices. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the scope of the present invention.

What is claimed is:

1. An optical waveguide comprising:
   a) a core having a refractive index $n_{co}$ and a radius $r_{co}$;
   b) an inner cladding laterally surrounding the core, the inner cladding having a refractive index $n_{ic}$ and an outer radius of $r_{ic}$;
   c) an outer cladding laterally surrounding the inner cladding, the outer cladding having a refractive index $n_{oc}$;
   d) wherein the core, inner cladding, and outer cladding have a depressed well configuration, wherein $n_{co} > n_{oc} > n_{ic}$, with
   e) the range of the ratio of the inner, depressed-well clad radius, $r_{ic}$, to core radius, $r_{co}$, varying from about 3.0 to 5.0;
   f) a $+\Delta$ of about 0.0020 to 0.0035;
   g) a $-\Delta$ of about $-0.001$ to $-0.0015$; and
   h) a $\Delta_{Tot}$ of about 0.0030 to 0.0045, wherein said fiber operates in three or more wavelength bands, wherein a first wavelength band is centered at about 1300 nm, and wherein a second wavelength band is centered at about 1625 nm, wherein the waveguide has a glass core and glass claddings, the waveguide further comprising a polymer coating adhered to the outer cladding, wherein the polymer coating comprises a material having a Shore D hardness value of at least 55, and further comprising a soft polymer material coating the polymer coating, wherein the soft polymer material comprises one or more coatings selected from the group of Desolite 3471-3-14, Desolite 3471-1-152A, and Shin-Etsu OF-206.

2. The optical waveguide of claim 1, wherein:
a) the depressed-well clad to core radius ratio is about 3.6;
b) the $+\Delta$ is about 0.0032;
c) the $-\Delta$ is about $-0.0011$; and
d) the $\Delta_{Tot}$ is about 0.0043.

3. The optical waveguide of claim 1, wherein the optical waveguide is a single-mode optical fiber.

4. The optical waveguide of claim 1, wherein the core has a diameter of about 10–12 micrometers.

5. The optical waveguide of claim 1, wherein:
a) the depressed-well clad to core radius ratio is about 3.9;
b) the $+\Delta$ is about 0.0027;
c) the $-\Delta$ is about $-0.0012$; and
d) the $\Delta_{Tot}$ is about 0.0039.

6. The optical waveguide of claim 1, having an operating wavelength range between about 1300 to 1650 nm and a cabled cutoff wavelength of less than or equal to 1280 nm.

7. The optical waveguide of claim 1, having an MFD between about 7.8 to about 9.0 microns when measured at 1300 nm.

8. The optical waveguide of claim 1, having an MFD between about 8.6 to about 10.2 microns when measured at 1550 nm.

9. The optical waveguide of claim 1, having bend losses less than or equal to 0.15 dB/turn when measured on a 10mm radius bend at 1550 nm and having bend losses less than or equal to 0.7 dB/turn when measured on a 10 mm radius bend at 1625 nm.

10. The optical waveguide of claim 1 having bend losses less than or equal to 0.02 dB/turn when measured on a 10 mm radius bend at 1550 nm.

11. The optical waveguide of claim 1 having bend losses less than or equal to 0.01 dB/turn when measured on a 10 mm radius bend at 1625 nm.

12. The optical waveguide of claim 1, wherein the inner cladding comprises one or more of the following: fluorosilicate, borosilicate, phosphorus fluorosilicate, phosphorus borosilicate, germanium fluorosilicate or germanium borosilicate composition.

13. An optical device including the optical waveguide of claim 1.

* * * * *

UNITED STATES PATENT AND TRADEMARK OFFICE
CERTIFICATE OF CORRECTION

| | |
|---|---|
| PATENT NO. | : 7,130,515 B2 |
| APPLICATION NO. | : 10/930575 |
| DATED | : October 31, 2006 |
| INVENTOR(S) | : Wayne F. Varner |

Page 1 of 1

It is certified that error appears in the above-identified patent and that said Letters Patent is hereby corrected as shown below:

<u>Title Page Item -56-</u>
Under Foreign Patent Documents, please add the following reference
--EP    1 107 027 A1   6/2001--

<u>Column 6,</u>
Line 46, delete "$n_{co}$" and insert in place thereof -- $n_{oc}$ --.

Signed and Sealed this

Twenty-fourth Day of April, 2007

JON W. DUDAS
*Director of the United States Patent and Trademark Office*